United States Patent Office 3,679,390
Patented July 25, 1972

---

3,679,390
SUSPENSION FERTILIZERS
Donald C. Young, Fullerton, Calif., assignor to Union Oil Company of California, Los Angeles, Calif.
No Drawing. Filed Nov. 21, 1969, Ser. No. 878,955
Int. Cl. C05b 15/00
U.S. Cl. 71—29
8 Claims

ABSTRACT OF THE DISCLOSURE

An aqueous, suspension fertilizer is described which contains up to about 75 weight percent insoluble solids that are present in the aqueous suspension at concentrations greater than their solubilities and are maintained in suspension by the presence of a calcium orthophophate gel. The compositions are prepared by admixing ammonium phosphate, the desired nutrient such as a potassium salt, urea source, ammonium salt, phosphate rock, acidulated phosphate rock, elemental phosphorus or sulfur, or a minor nutrient such as a salt of any of the trace metals, and then adding a soluble calcium salt to gel the mixture. The compositions are preferably prepared under highly turbulent conditions to insure intimate dispersion of the calcium salt gelling agent throughout the liquid before precipitation occurs. It has been found that the compositions prepared in this manner are highly thixotropic and resist settling under static or dynamic conditions. The compositions are prepared at a pH value from about 6.5 to about 7.4 where the maximum thixotropicity of the calcium orthophosphate precipitate can be achieved. In this fashion, maximum gelation is effected with the minimum quantity of the calcium salt.

DESCRIPTION OF THE INVENTION

This invention relates to liquid fertilizers and in particular relates to liquid suspensions of plant nutrients in supersaturated condition.

There is a growing demand for liquid fertilizers since these materials are more adaptable to mechanization. Difficulty is encountered with liquid fertilizers, however, since the plant nurtient salts have limited solubilities and the use of entirely liquid solutions requires the application of large quantities of water to achieve adequate levels of fertilization. Thus, a typical potassium salt requires up to about 3 weight parts water per part of salt for solubility, while the nitrogenous fertilizers require up to about equal weight amounts of water for solubility.

Because of the limited solubility of the plant nutrients, recent practice has been to prepare suspensions which contain the nutrients at supersaturated conditions. These suspensions can contain a high quantity of the plant nutrients as finely dispersed solids, however, difficulty has been experienced in obtaining a composition which can remain as a suspension during extended storage and which can be readily applied with conventional liquid fertilizer applicators. One commonly used dispersant for the preparation of such suspensions is clay, which serves as a flocculating agent to prevent precipitation of the suspension. The clay is not entirely satisfactory, however, since the clay suspensions still settle during storage and it is, therefore, necessary to maintain the suspensions under constant agitation. The finely subdivided clay is also highly abrasive and considerably higher maintenance is experienced with equipment applying the clay suspensions.

I have now found that a technique previously developed by me for the preparation of a fire retardant gel composition can be adopted for the preparation of suspension fertilizers. This technique is described in my prior Pat. No. 3,245,904, which is incorporated herein by reference.

In this prior patent, I have disclosed that ammonium phosphate solutions of a typically "8-24-0" designation can be converted into a thixotropic gel by the addition of minor amounts of a soluble calcium salt. The resultant ammonium phosphate gel was disclosed in the aforecited patent as being useful for aerial applications to brush and forest fires since the gelled composition resists dispersion by wind currents when applied.

I have now discovered that a stable, highly thixotropic suspension of plant nutrients can be formed provided that the gelation of the ammonium phosphate solution with the calicum salt is performed in the presence of the aforementioned nutrients at their supersaturated concentration. Surprisingly, attempts to achieve the same compositions by adding the nutrients to a preformed ammonium phosphate gel have been unsuccessful. It is believed that the in situ formation of the gel in the presence of the insoluble solid nutrients intimately disperses these solids into the gel composition more thoroughly than can be achieved by admixing of the nutrients ito the preformed gel.

The gel compositions are believed to contain polymers of calcium orthophosphate hydrate. At the optimum pH values, the calcium orthophosphate is highly hydrated and the water serves to link the particles together into a hydrate polymer. It was therefore surprising to find that the presence of polyelectrolytes such as potassium salts or highly hydrated solutes such as urea or ammonium nitrate did not interfere with the gelation of the compositions. It is generally believed that a high salt concentration and/or presence of crystals inhibits or substantially reduces the formation of gels, often by providing a surface for the coagulation of the gelling precipitate. Contrary to these expectations, I have found that the ammonium phosphate compositions containing insoluble plant nutrients can, nevertheless, be converted to a highly thixotropic and stable gel by the addition of the calcium salt precipitate.

The suspension fertilizers produced in accordance with my invention are particularly valuable since they can contain a very high concentration of supersaturated nutrients, i.e., solids. The compositions are also very stable and do not settle even with prolonged storage and/or agitation.

The calcium orthophosphate particles are bound together by hydration forces and can be depolymerized by mechanical working. The application of shear to the gelled compositions depolymerizes the compositions sufficiently to decrease their viscosities substantially. Upon removal of the shear force, however, the compositions readily revert to their original, highly viscous and gelatinous characteristics. It is believed that this is the explanation for the observation that the gels are highly thixotropic and the application of a shear force results in a very marked decrease in viscosity of the compositions. This characteristic is highly desirable since the suspensions can be readily pumped and sprayed with only slightly greater energy requirements than for simple solutions. The suspensions are, consequently, entirely compatible with the present spray equipment used for the application of solutions of plant nutrients. Finally, there is no abrasive flocculant such as clay in the suspensions to cause abnormal wear of the equipment.

In general, any solid having a plant nutrient value can be incorporated in the compositions by subdividing the solid to a powder and adding the solid to the ammonium phosphate base solution used in the preparation of the compositions. Examples of various conventional nutrients which can be used include the potassium salts such as potassium sulfate, potassium phosphate, potassium chloride, potassium nitrate, etc.; the ammonium salts such as ammonium sulfate, ammonium nitrate, ammonium thiosulfate, etc.; elemental sulfur; a urea-containing material such as urea or the urea-formaldehyde solids such as methylolurea or the urea formaldehyde resins such as are described in Pats. 2,415,705 and 2,644,806 obtained by condensing urea and formaldehyde under acidic conditions to obtain a slow release fertilizer; a phosphate source such as phosphate rock, superphosphate which is prepared by admixing sulfuric acid with finely divided phosphate rock for a period of 1 to 24 hours and then storing the acidulated rock for 3 to 14 days; or triple superphosphate which is similarly prepared by acidulating finely divided phosphate rock with phosphoric acid, etc.; a source of a minor nutrient such as a sulfate, nitrate or hydrochloride salt, oxide or lignin sulfite complex of iron, zinc, manganese, copper, magnesium, boron or molybdenum. The latter complexes are produced from waste sulfite liquor in the pulp and paper industry. The minor nutrients, i.e., the aforementioned trace metal compounds, when used can constitute from 0.1 to about 10 weight percent of the total composition.

The aforementioned nutrients are compounded in the composition by their addition to the ammonium phosphate base solution at any desired concentration in excess of the saturated condition of any one or more of the added nutrients. The resulting composition will therefore contain insoluble solids which are maintained in suspension by the calcium phosphate gel hereinafter described. In general, the concentration of such solids can be from about 2 to about 75 weight percent of the total composition, preferably from about 5 to 55 weight percent of the total composition.

The solids should be finely subdivided before dispersion in the base solution, passing a 20 mesh and, preferably, a 50 mesh screen. Preferably, the solids used are retained by a 400 mesh screen and most preferably by a 200 mesh screen to avoid excessive grinding requirements.

The ammonium phosphate base solutions which are used in the preparation of the gel are aqueous solutions of mono-ammonium and di-ammonium orthophosphates. Typical of such base solutions is the commercially available material designated in the fertilizer trade as "8–24–0," which contains 8 weight percent nitrogen in the form of ammonia and 24 weight percent phosphorus expressed as the anhydride, $P_2O_5$.

The ammonium phosphate solute in the base solutions have an average composition designated by the empirical formula, $(NH_4)_xH_yPO_4$; wherein $x+y=3$.

Expressed in terms of their nitrogen to phosphorus weight ratio, calculated as $P_2O_5$, the composition of the ammonium orthophosphates is from 0.25 to 0.40, preferably 0.31 to 0.39 parts of ammoniacal nitrogen per part of phosphorus (expressed as $P_2O_5$). The values of $x$ in the preceding formula are from 1.35 to 2.0; that of $y$ from 1.0 to 1.65; and for the preferred composition the values are between 1.6 and 2.0 for $x$ and between 1.0 and 1.4 for $y$. The pH of these solutions is about neutral. To minimize the concentration of the calcium salt precipitate which is necessary to achieve the desired gelatin, the solutions should have a pH value from about 6.5 to about 7.4, and preferably, from about 6.6 to about 7.0.

The compositions also contain an optimum water content which minimizes the amount of calcium gelling additive. It is believed that this is the result of water being a part of the final gel composition and providing the proper degree of hydration of the calcium orthophosphate. While the optimum water content will vary for every formulation, this amount can be determined by observation of the viscosities of freshly prepared material. Sample formulations can be prepared with incremental increases in the concentration of the calcium gelling additive. Compositions that are at or near their optimum water content will exhibit a smoothly increasing viscosity with increasing concentration of the gelling additive. If the solutions contain inadequate water, the viscosity change will exhibit a sharp transition, i.e., the viscosity will, at low gelling agent concentrations, increase very gradually and then, at higher calcium gelling agent concentrations, will increase very sharply. The water limited compositions will also require greater concentrations of the calcium gelling agent to achieve the same viscosities as those of compositions at or near the optimum water content. When using ammonium phosphate base solutions which have salting out temperatures from about $-10°$ to $20°$ C. corresponding to an ammonium phosphate solute content from about 25 to 40 weight percent, the optimum water content can be achieved by the addition of from 0.1 to about 20, preferably from 1 to about 15 weight percent water.

Acyclic polyphosphates can also be provided in the aforedescribed base solution by the addition of a soluble phosphate salt thereto, or by the concentration of a phosphoric acid used in the preparation of the ammonium phosphate solution to a value between about 71 and 80 weight percent phosphorus expressed as $P_2O_5$ prior to neutralization with ammonia. These polyphosphates can comprise from about 1 to 60 weight percent of the total phosphorus content of the solutions. Preferably they comprise from about 5 to 35 weight percent of the phosphorus. Examples of acyclic polyphosphates which can be included in these base solutions include pyrophosphate, tripolyphosphate, tetrapolyphosphate, pentapolyphosphate, hexapolyphosphate, heptapolyphosphate, etc.; the aforegoing species being listed in order of increasing molecular dehydroation states of orthophosphates from which they are commonly derived.

Alkali metal and ammonium salts of some or all the aforementioned polyphosphates are commercially available. Representative of such are the following: tetrasodium pyrophosphate, disodium dihydrogen pyrophosphate, pentapotassium tripolyphosphate, sodium tripolyphoshate, cesium hydrogen triolyphosphate, lithium sodium tetraolyphosphate, lithium hydrogen pentapolyphosphate, etc.

Aqueous solutions of ammonium salts of the aforementioned acyclic polyphosphates are also available or can be readily obtained by ammonia neutralization of furnace grade or wet process phosphoric acids having concentrations between about 71 and about 80 percent phosphorus (expressed as $P_2O_5$). These solutions are obtained with pH values between about 6.0 and 8.0 in concentrations up to about 60 weight percent solute content. The solute comprises between about 40 and about 95 percent of ammonium orthophosphate salts, the remainder being ammonium acyclic polyphosphate salts which are present in the following percentages:

| | |
|---|---|
| Ammonium pyrophosphates | 3–47 |
| Ammonium tripolyphosphates | 2–30 |
| Ammonium tetrapolyphosphates | 0–15 |
| Ammonium pentapolyphosphates | 0–11 |
| Ammonium hexapolyphosphates | 0–9 |
| Ammonium heptapolyphosphates | 0–7 |

The aforementioned aqueous solutions of ammonium ortho- and polyphosphates can be used directly as the base in the preparation of my suspension fertilizers, or if desired, can be blended with solutions of ammonium orthophosphates to reduce the polyphosphate content in the base solution.

Suspension fertilizers can also be prepared from the ammonium phosphate solutions derived from wet-process phosphoric acid which are described in my prior Pat. No. 3,044,851. The phosphate content of these solutions, expressed as $P_2O_5$ is between about 5 and 40 weight percent of which between about 95 and about 20 weight percent is present as orthophosphate, the remainder being present as molecularly dehydrated acyclic polyphosphates. The solutions as well as those from the concentrated furnace grade acid have a pH between about 6.5 and about 7.4 with a nitrogen to phosphorus ratio similar to that previously described, between about 0.25 and about 0.50 part of ammoniacal nitrogen per part of phosphorus (calculated as $P_2O_5$). Because the solutions are derived from wet process phosphoric acid, they contain the impurities incident in such acid; between about 0.5 and about 10.0 weight percent calculated as the oxides of metal cations which are complexed by the acyclic polyphosphate. These impurities generally comprise iron and aluminum with lesser amounts of magnesium, copper, zinc, vanadium and chromium.

The gelation of the aforementioned base solutions can be achieved by the addition of calcium cations to the base solutions in amounts comprising from about 1.0 to about 5.0 weight percent of the composition, calculated as calcium oxide. At the pH values of the solutions, i.e., between about 6.5 and about 7.4, calcium ions form insoluble phosphate salts which are very flocculent and which impart maximum gelation to the compositions. With the base solutions comprising entirely or chiefly orthophosphates, the optimum amount of calcium salt that can be added to effect suitable gelation is an amount from about 1.5 to about 3.5 weight percent of the final composition. The polyphosphate containing base solutions requires slightly greater quantities of the calcium salt to achieve adequate gelation and this optimum amount is generally from about 2.5 to 4.5 weight percent of the final composition. Slightly higher quantities of the calcium gelling agent are required to saturate the sequestering capacity of the polyphosphates before the calcium is available to form the insoluble orthophosphate. The polyphosphates, however, enhance the stability and viscosity properties of the final composition. It is believed that the polyphosphates function to block crystal growth and, therefore, maintain a desirably low particle size of the insoluble calcium orthophosphate.

Any water soluble salt of calcium can be used as a source of calcium ions. Illustrative, but not exclusive of such salts, are salts of mineral acids and $C_1$-$C_6$ alkanoic acids such as the following: calcium acetate, calcium bromide, calcium chlorate, calcium perchlorate, calcium chloride, calcium fluoride, calcium chromate, calcium ferroyanide, calcium formate, calcium iodide, calcium isobutyrate, calcium alpha-methylbutyrate, calcium nitrate, calcium nitrite, calcium propionate, etc. Because it is readily available, calcium chloride is the preferred source of calcium ions.

It is preferred to minimize the amount of the calcium salt which is added to the composition and this is achieved by operating under the pH conditions from 6.5 to 7.4, preferably from about 6.6 to about 7.0. It is likewise preferable to form the gel in situ with all of the solids desired in the final composition added to the base solution and suspended therein by suitable agitation before addition of the calcium salt. The calcium salt can be added to the base solution as a solid, however, I prefer to add an aqueous solution containing from about 5 to about 45 weight percent calcium (calculated as calcium oxide) in sufficient quantity to achieve the aforementioned concentration of the calcium in the final composition. This liquid solution is introduced into contact with the base solution containing the suspended plant nutrients using a high degree of turbulence to achieve intimate dispersion of the calcium salt throughout the liquid suspension before the calcium orthophosphate precipitate has formed. In this manner, the amount of calcium necessary to effect gelation can be minimized and maximum stability of the final fertilizer suspension can be achieved. The calcium phosphate precipitate forms immediately upon addition of the calcium salt and achieves its maximum viscosity within a period from about 5 minutes to one hour after its formation. The fertilizer compositions of my invention are prepared with the proper quantity of the calcium precipitant and with minor amounts of water added so as to achieve suspensions having viscosities from about 2000 to 10,000 centipoise seconds as determined 15 minutes after their preparation on a Brookfield viscosimeter at room temperature and with a spindle speed of 20 revolutions per minute. All determinations of viscosity are made on the fourth revolution of the spindle to standardize the testing and avoid the effect of accumulated shear on the determination. Preferably, the suspensions when tested under the aforementioned procedure should have a viscosity from about 3500 to about 5000 centipoise seconds.

The following table will illustrate various compositions which can be prepared in accordance with my suspension technique:

TABLE.—WEIGHT PERCENT COMPONENTS
(Except calcium precipitant)

| Designation | Water | 10-31-0 | $K_2SO_4$ | $KNO_3$ | Urea | Sulfur | Super phosphate | $NH_4NO_3$ |
|---|---|---|---|---|---|---|---|---|
| 5-15-27 | 1.6 | 48.4 | 50.0 | | 22.1 | | | |
| 15-15-15 | 1.8 | 48.4 | 27.7 | | 22.1 | | | |
| 10-10-25 | 6.7 | 32.3 | 46.3 | | 14.7 | | | |
| 28-15-0 | 1.3 | 48.4 | | | 50.3 | | | |
| 5-15-25 | 5.3 | 48.4 | 46.3 | | | | | |
| 10-14-17 | 1.2 | 45.0 | 3.8 | 40 | | | | |
| 30-10-4 | 1.5 | 32.3 | 8 | | 58.2 | | | |
| 20-18-0 | 2.0 | 58.0 | | | | | | 40.0 |
| 10-12-23 | 1.8 | 38.8 | 42.0 | | | | | 17.4 |
| 15-15-8 | 1.6 | 48.4 | 15 | | 25 | 10 | | |
| 20-20-0 | 1.3 | 32.3 | | | 35.2 | 9 | 22.2 | |
| 10-22-11 | 1.5 | 38.8 | 20 | | | | 22.2 | 17.5 |
| 8-24-12 | 1.6 | 42.0 | | 32.0 | | | 24.4 | |
| 16-25-0 | 1.3 | 32.3 | | | 27 | 6 | 33.4 | |
| 4-26-15 | 2.0 | 38.8 | 28 | | | | 31.2 | |
| 12-27-5 | 0.9 | 32.3 | 10 | | 19 | | 37.8 | |
| 13-28-0 | 0.7 | 32.3 | | | | | 40.0 | 27 |
| 16-25-0 [1] | 1.1 | 31.1 | | | 27 | 6 | 33.0 | |

[1] Also containing 1.5 weight percent of a mixture of trace metals in the following proportions: 4 parts iron, 3 parts zinc, 1 part each of manganese, copper and magnesium as a complex with Rayplex, a commercial lignin sulfite complexing agent.

The aforetabulated compositions containing water, the base solution and the added plant nutrients can be gelled into the desired suspension fertilizer by the addition thereto of an aqueous solution of any of the aforementioned water soluble calcium salts in a concentration sufficient to provide from about 1 to about 5.0 weight percent calcium calculated as the oxide in the final composition. The calcium is generally added as a solution and, preferably, an aqueous solution containing from about 30 to 45 weight percent calcium chloride is employed. With this solution, the addition of from about 4 to about 10 parts by weight of the calcium chloride solution to each hundred parts by weight of the aforetabulated mixtures will achieve the preparation of the desired suspension fertilizers.

The suspension fertilizers can be prepared in a variety of means. In laboratory investigations, the fertilizer compositions can be prepared in a Waring Blendor or can be prepared in a small jar equipped with a suitable propeller mixer. The preparation of the compositions in commercial quantities can be performed using suitable batch equipment with propeller mixers, or preferably, can be performed in a continuous manner using a centrifugal pump to circulate the base solution containing the suspension of nutrients. The aqueous solution of the calcium salt can be added to the base solution while it is under highly turbulent conditions, e.g., while being stirred in the blender or kettle, or the aqueous solution of the calcium salt can be continuously added to the ungelled suspension as it enters the centrifugal pump and the resultant agitation in the centrifugal pump will adequately disperse the components and effect optimum gelation of the composition. In alternative preparations, the compositions can be injected into in-line mixers, e.g., a line equipped with a plurality of orifice plates or suitable flow baffling conditions to achieve turbulent flow conditions and the base solution containing these suspended plant nutrients can be admixed with the aqueous solution of the calcium precipitate at the entrance to the line mixer.

The invention will now be illustrated by the following example:

A sample of 100 milliliters of the suspension is placed in a 100 milliliter centrifuge tube and the tube is placed in a shaking device having a ⅞-inch reciprocating motion. A second 100 milliliter sample is placed in a graduate and permitted to set, undisturbed.

After one day and after one week, the samples are inspected for any separation of clear liquid from the gel, the shaken by hand and again inspected for the amount of separation. The volume percent of the gelled suspension observed is reported in the following table in the columns identified as follows:

S = Static storage
SS = Static storage after hand shaking
D = Dynamic (shaker) storage
DS = Dynamic storage after hand shaking

TABLE

| | | | | | | Vol. percent suspension remaining after— | | | | | |
|---|---|---|---|---|---|---|---|---|---|---|---|
| | | | | | | One day | | | | One week | |
| Experiment | Base solution, g. | Suspended solid, g. | CaCl₂, ml. | H₂O, g. | Viscosity, cps. | S | SS | D | DS | S | SS |
| 1 | ¹8-24-0, 126.2 | K₂SO₄, 126.2 | 8 | 252 | 200 | 70 | 74 | 25 | 67 | 70 | 73 |
| 2 | ¹8-24-0, 126.2 | K₂SO₄, 126.2 | 16 | 252 | 1,000 | 95 | 91 | 60 | 73 | 94 | 90 |
| 3 | ¹8-24-0, 126.2 | K₂SO₄, 126.2 | 24 | 252 | 7,500 | 96 | 97 | 75 | 80 | 96 | 96 |
| 4 | ¹8-24-0, 216.7 | K₂SO₄, 216.7 | 8 | 144.5 | 1,030 | 80 | 72 | 65 | 65 | 78 | 78 |
| 5 | ¹8-24-0, 216.7 | K₂SO₄, 216.7 | 16 | 144.5 | 1,250 | 94 | 88 | 65 | 72 | 93 | 88 |
| 6 | ¹8-24-0, 216.7 | K₂SO₄, 216.7 | 24 | 144.5 | 3,000 | 98 | 99 | 60 | 85 | 97 | 96 |
| 7 | ¹8-24-0, 285.5 | K₂SO₄, 285.5 | 8 | 63.5 | 450 | 88 | 82 | 72 | 75 | 87 | 81 |
| 8 | ¹8-24-0, 285.5 | K₂SO₄, 285.5 | 16 | 63.5 | 1,780 | 93 | 89 | 75 | 75 | 92 | 88 |
| 9 | ¹8-24-0, 285.5 | K₂SO₄, 285.5 | 24 | 63.5 | 5,000 | 98 | 97 | 85 | 82 | 98 | 94 |
| 10 | ¹8-24-0, 340 | K₂SO₄, 340 | 8 | 0 | 2,700 | 97 | 99 | 75 | 80 | 92 | 87 |
| 11 | ¹8-24-0, 340 | K₂SO₄, 340 | 16 | 0 | 4,300 | 97 | 97 | 80 | 80 | 96 | 92 |
| 12 | ¹8-24-0, 340 | K₂SO₄, 340 | 24 | 0 | 10,000 | 99 | 100 | 80 | 85 | 99 | 96 |
| 13 | ¹8-24-0, 363 | K₂SO₄, 155.7 | 16 | 57.6 | 900 | 96 | 98 | 65 | 70 | 96 | 90 |
| 14 | ¹8-24-0, 363 | K₂SO₄, 155.7 | 24 | 57.6 | 3,600 | 98 | 97 | 72 | 70 | 99 | 96 |
| 15 | ¹8-24-0, 114.2 | Urea, 114.2 | 8 | 228.5 | 300 | | | 85 | 55 | 98 | 96 |
| 16 | ¹8-24-0, 114.2 | Urea, 114.2 | 16 | 228.5 | 2,500 | | | 100 | 100 | 100 | 99 |
| 17 | ¹8-24-0, 114.2 | Urea, 114.2 | 24 | 228.5 | 9,000 | | | 100 | 60 | 100 | 99 |
| 18 | ¹8-24-0, 232.2 | Urea, 232.2 | 8 | 51.6 | 190 | 52 | 50 | 77 | 80 | 30 | 45 |
| 19 | ¹8-24-0, 232.2 | Urea, 232.2 | 16 | 51.6 | 2,600 | 100 | 96 | 100 | 100 | 100 | 95 |
| 20 | ¹8-24-0, 232.2 | Urea, 232.2 | 24 | 51.6 | 7,000 | 100 | 100 | 100 | 100 | 100 | 100 |
| 21 | ¹8-24-0, 266.5 | Urea, 266.5 | 8 | 0 | 1,000 | 42 | 66 | 57 | 53 | | 64 |
| 22 | ¹8-24-0, 266.5 | Urea, 266.5 | 16 | 0 | 2,600 | 58 | 54 | 70 | 52 | | 53 |
| 23 | ¹8-24-0, 226.5 | Urea, 266.5 | 24 | 0 | 10,000 | 60 | 53 | 75 | 70 | 55 | 49 |
| 24 | ²10-31-0, 115.2 | Urea, 115.2 | 24 | 230.5 | 760 | 100 | 100 | 60 | 57 | 100 | 100 |
| 25 | ²10-31-0, 115.2 | Urea, 115.2 | 32 | 230.5 | 1,790 | 100 | 100 | 67 | 58 | 100 | 100 |
| 26 | ²10-31-0, 115.2 | Urea, 115.2 | 40 | 230.5 | 3,545 | 100 | 100 | 82 | 70 | 100 | 100 |
| 27 | ²10-31-0, 115.2 | Urea, 115.2 | 48 | 230.5 | 4,155 | 100 | 100 | 82 | 75 | 100 | 100 |
| 28 | ²10-31-0, 272 | Urea, 272 | 8 | 0 | 340 | 100 | 88 | 77 | 70 | 100 | 78 |
| 29 | ²10-31-0, 272 | Urea, 272 | 24 | 0 | 6,100 | 100 | 100 | 88 | 78 | 100 | 98 |
| 30 | ²10-31-0, 272 | Urea, 272 | 40 | 0 | 7,350 | 100 | 100 | 100 | 84 | 100 | 100 |
| 31 | ²10-31-0, 272 | Urea, 272 | 48 | 0 | 7,600 | 100 | 100 | 100 | 84 | 100 | 100 |
| 32 | ²10-31-0, 171.2 | K₂SO₄, 73.3 | 8 | 244.5 | 550 | | | 60 | 100 | 96 | 98 |
| 33 | ²10-31-0, 171.2 | K₂SO₄, 73.3 | 32 | 244.5 | 800 | | | 70 | 25 | 97 | 94 |
| 34 | ²10-31-0, 171.2 | K₂SO₄, 73.3 | 48 | 244.5 | 2,500 | | | 100 | 98 | 99 | 96 |
| 35 | ²10-31-0, 382.6 | K₂SO₄, 153.9 | 24 | 59.6 | 60 | | | 90 | 90 | 99 | 100 |
| 36 | ²10-31-0, 441 | K₂SO₄, 189 | 24 | 0 | 60 | | | 100 | 100 | 26 | 26 |
| 37 | ²10-31-0, 441 | K₂SO₄, 189 | 32 | 0 | 500 | | | 100 | 100 | 99 | 99 |

¹ A mixture of mono- and di-ammonium orthophosphates.
² A mixture of mono- and di-ammonium orthophosphates with about 30 percent of the phosphorus present as acyclic polyphosphates prepared from concentrated wet-process phosphoric and containing about 1.2 weight percent metal impurities comprising iron, aluminum and magnesium.

Example

Suspensions of plant nutrients are prepared using a two-speed Waring blender with a four blade cutter-mixer. The ammonium phosphate base solutions are premixed with the plant nutrient solid and 400 milliliter portions of the resultant slurry are introduced into the blender for each test. The solid nutrients are powdered and screened and the particles passing a 50 mesh but retained on a 100 mesh screen are used to prepare the slurry. When additional water is used in the formulation, it is added to the blender before introduction of the calcium chloride gelling agent.

The calcium chloride gelling agent is dissolved in water to prepare a solution containing 38 weight percent solute. This solution is added to the blender in successive experiments with incrementally increasing quantities while the blender is running. Five seconds after addition of the gelling agent, the blender is stopped and the thickened suspension is poured immediately into a 600 milliliter sample bottle and stored, undisturbed, for 15 minutes. A sample is then removed and its viscosity is determined with a Brookfield viscometer model RVF having a number 4 stainless steel spindle rotating at 20 r.p.m.

The preceding data indicate that gelatinous suspensions can be prepared which are highly resistant to separation under dynamic and quiescent storage conditions. The data further show that the degree of stability and viscosity of the compositions can be increased by increasing the amount of the calcium gelling agent within the range investigated or by the addition of from 1 to about 20 weight percent water. The results obtained by use of the polyphosphate containing base solution (10–31–0) indicate that slightly greater quantities of the calcium gelling agent are required to achieve viscosities comparable to the viscosities of gels produced from the entirely orthophosphate solutions. The presence of the polyphosphates, however enhances the stability of the gels and yields, generally, superior suspensions.

The compositions hereinabove described can similarly be prepared by the addition of the aforespecified nutrient solutions in the requisite amount necessary to obtain the final composition. Similarly, results of gel viscosity and stability will be observed for these other nutrient solids.

The preceding example is intended solely to illustrate the laboratory preparation of the suspensions and to demonstrate results attainable thereby. It is not intended that this be unduly limiting of the invention, but instead, it is

I claim:

1. The method for the preparation of a stable, suspension of plant nutrients that comprises admixing from 2 to about 75 weight percent, based on the total suspension, of finely divided plant nutrient solids having a particle size passing a 50 but retained on a 400 mesh screen and selected from the class consisting of potassium sulfate, nitrate and chloride, urea, urea-formaldehyde condensation product, phosphate rock, superphosphate, triple superphosphate and mixtures thereof, and from 0.1 to 20 weight percent, based on the total suspension, of water with an aqueous base solution of mono- and di-ammonium orthophosphates containing from 25 to 40 weight percent of said ammonium orthophosphates, turbulently agitating the admixture to disperse said solids in said base solution and thereafter adding as a solid or as an aqueous solution, a water soluble calcium salt selected from the class consisting of calcium chloride, calcium nitrate and calcium salts of $C_1$–$C_6$ alkanoic acids, in an amount from 1 to about 5 weight percent expressed as CaO, to form insoluble calcium orthophosphate in an amount effective to form a thixotropic gel while operating at a pH from 6.5 to 7.4 and adding sufficient of said water and calcium salt to prepare suspensions having viscosities between about 2000 and 10,000 centipoise seconds and thereby retain said nutrients in stable suspension.

2. The method of claim 1 wherein said base solution contains from 5 to about 60 weight percent of its phosphate content in the form of acyclic polyphosphates.

3. The method of claim 1 wherein from 1 to 15 weight percent water is added to said admixture, prior to the addition of said calcium salt, in an amount effective to provide maximum gelation of said admixture.

4. The method of claim 1 wherein said nutrient solids are potassium sulfate, nitrate or chloride.

5. The method of claim 1 wherein said nutrient solid is urea.

6. The method of claim 1 wherein said water soluble calcium salt is calcium chloride.

7. The method of claim 6 wherein said calcium chloride is employed as an aqueous solution having from 5 to 45 weight percent, expressed as calcium oxide.

8. The method of claim 1 wherein said aqueous base solution consists essentially of mono- and di-ammonium orthophosphates.

References Cited

UNITED STATES PATENTS

| | | | |
|---|---|---|---|
| 3,019,099 | 1/1962 | Walters | 71—34 |
| 3,041,160 | 6/1962 | MaKower et al. | 71—43 X |
| 3,044,851 | 7/1962 | Young | 23—107 |
| 3,245,904 | 4/1966 | Young | 71—41 X |
| 3,526,495 | 9/1970 | Philen et al. | 71—34 |

CHARLES N. HART, Primary Examiner

U.S. Cl. X.R.

71—53, 64 C